United States Patent
Miller et al.

(10) Patent No.: US 8,271,789 B2
(45) Date of Patent: Sep. 18, 2012

(54) SYSTEM AND METHOD FOR MANAGING USAGE AUTHORIZATIONS BASED ON THE USE OF SMART CARDS

(75) Inventors: Norbert Miller, Monchengladbach (DE); Wolfgang Flugge, Schwalmtal (DE); Martin Koczwara, Wegberg (DE)

(73) Assignee: Scheidt & Bachmann GmbH, Mönchengladbach (DE)

( * ) Notice: Subject to any disclaimer, the term of this patent is extended or adjusted under 35 U.S.C. 154(b) by 1176 days.

(21) Appl. No.: 10/918,004

(22) Filed: Aug. 13, 2004

(65) Prior Publication Data

US 2006/0036863 A1     Feb. 16, 2006

(51) Int. Cl.
*H04L 9/32* (2006.01)

(52) U.S. Cl. ............. 713/172; 713/185; 726/9; 726/20; 726/27; 726/28; 726/29; 726/30; 705/16; 705/39; 705/40; 705/41; 705/50; 705/51; 705/52; 705/53; 705/65; 235/380; 235/282; 709/232

(58) Field of Classification Search ............... 726/9, 20, 726/27–30; 713/172, 185; 705/16, 39–41
See application file for complete search history.

(56) References Cited

U.S. PATENT DOCUMENTS

| | | | | |
|---|---|---|---|---|
| 4,630,201 A * | 12/1986 | White | ............. | 705/44 |
| 5,557,516 A * | 9/1996 | Hogan | ............. | 705/41 |
| 5,969,316 A * | 10/1999 | Greer et al. | ............. | 235/375 |
| 6,018,717 A * | 1/2000 | Lee et al. | ............. | 705/13 |
| 6,129,274 A * | 10/2000 | Suzuki | ............. | 235/381 |
| 6,505,774 B1 * | 1/2003 | Fulcher et al. | ............. | 235/381 |
| 6,655,587 B2 | 12/2003 | Andrews et al. | | |
| 6,687,714 B1 | 2/2004 | Kogen et al. | | |
| 6,732,922 B2 * | 5/2004 | Lindgren et al. | ............. | 235/381 |
| 7,418,717 B1 * | 8/2008 | Dolske et al. | ............. | 719/328 |
| 2002/0010650 A1 | 1/2002 | Wuerttemberg et al. | | |
| 2002/0082925 A1 * | 6/2002 | Herwig | ............. | 705/16 |
| 2003/0019927 A1 | 1/2003 | Lindgren et al. | | |
| 2003/0034389 A1 * | 2/2003 | Cantini et al. | ............. | 235/380 |
| 2003/0140230 A1 * | 7/2003 | de Jong et al. | ............. | 713/182 |
| 2004/0099732 A1 * | 5/2004 | Andrews et al. | ............. | 235/380 |
| 2004/0103061 A1 * | 5/2004 | Wood et al. | ............. | 705/41 |
| 2004/0226993 A1 * | 11/2004 | Fulcher et al. | ............. | 235/381 |
| 2004/0235450 A1 * | 11/2004 | Rosenberg | ............. | 455/406 |
| 2004/0241627 A1 * | 12/2004 | Delfing | ............. | 434/219 |

FOREIGN PATENT DOCUMENTS

| | | |
|---|---|---|
| EP | 0416916 A2 * | 9/1990 |
| EP | 416 916 | 3/1991 |
| WO | WO 96/09592 | 3/1996 |
| WO | WO0055784 | 9/2000 |
| WO | WO 01/69548 | 9/2001 |

* cited by examiner

*Primary Examiner* — Edan Orgad
*Assistant Examiner* — Canh Le
(74) *Attorney, Agent, or Firm* — Gudrun E. Huckett

(57) ABSTRACT

Disclosed is a system managing usage authorizations, comprising a central computer system, field devices and smart cards, wherein the system maintains databases containing all information relating to the users, user accounts, user smart cards, field devices and products, establishes and maintains at least at times communication with the field devices, issues instructions based on the available information and transmits to a plurality of field devices, with the field devices maintaining information relating to the smart cards and products so that communication between a field device and a smart card allows at least a portion of the smart card-related instructions to be processed from the instruction list and stored on the field device and to be transmitted to the computer system during the next communication, and wherein the smart cards carry to allow exchange of information with a field device and store instructions.

11 Claims, 3 Drawing Sheets

SYSTEM AND METHOD FOR MANAGING USAGE AUTHORIZATIONS BASED ON THE USE OF SMART CARDS

TECHNICAL FIELD OF INVENTION

The present invention relates to a system and a method for managing usage authorizations that are based on the use of smart cards, comprising a central computer system, field devices and smart cards carried by potential users.

BRIEF SUMMARY OF RELATED ART

Systems and methods for managing usage authorizations on the basis of smart card usage are employed and being developed extensively.

For example, in the application relating to the use of public means of transportation such systems are already common. The users are equipped with system-based smart cards and then have the opportunity to utilize the offered traffic connections, rail system, bus, ferry or the like. Various systems are known in this connection. In the simplest case the smart card replaces an individual ticket in that the smart card is supplied at the provided stations with the concrete authorization information in return for payment. Payment can be made with cash, cash-less, e.g. by means of a credit card, direct debit or in some other manner. Field devices, which can establish a communication connection with the smart card and in the described simplest case can directly obtain the authorization information and thus grant permission by providing access to the user, are used as access control units.

Smart cards, however, are much more flexible, and the systems can be used much more comprehensively without difficulty.

For example, systems that are based on central computers wherein a permanent communication connection exists between the central computer and the field devices are known. When a smart card appears in the communication area of a field device in connection with a desired usage, the field device polls the central computer regarding the creditworthiness of the customer and then either grants or does not grant access. Such systems, however, are not suited for mass operation, for example for public transportation in metropolitan areas, because the temporal processes in relation to credit card verification, bank debit and the like are not compatible with the requirements relating to a quick access authorization decision. Extensive failures, long waiting lines and the like can occur.

To avoid this, it has been suggested for example in U.S. Pat. No. 6,655,587 B2 to equip smart cards with a so-called autoload flag. Here, previously established credit balances in the central computer are transferred between the smart card and a field device of the smart card when a communication connection has been established. The smart card is thus loaded like a cash card and is also used as such for obtaining access permissions, i.e. tickets and the like. Since both the credit card information and the flag have been stored on the card, misuse can be avoided e.g. when the card is lost. In the above-described system the field device deletes a transmitted action after processing, i.e. this information is lost.

All systems in principle are aimed at a match between the current, payable usage request of the user and his actual creditworthiness.

All known systems have various disadvantages in this respect. The usage providers are generally limited to the usual creditworthiness possibilities. In other words the customer can have a credit balance, can use a credit card or for example can permit a debit authorization, however this makes sense from a time aspect only if the account also has the appropriate balance available, the verification of which in turn cannot be reconciled with the customer's desired current usage.

Beyond that, the known systems are highly security sensitive. Generally the creditworthiness information, such as credit card numbers and the like, are stored on the smart cards themselves, as is the necessary personal information. The loss of a smart card thus represents a significant security risk. Moreover the smart cards become independent to a certain extent, which means that when the credit card information or the like that is stored thereon is used, the cards can be permanently misused. Finally, the systems are not sufficiently flexible since the system operator and/or the customer must anticipate a desired usage sufficiently in advance in order to be able to execute a spontaneously desired usage under reaction conditions with short notice.

Additionally, a need exists for a system or method of this kind, which can be applied in the largest possible spectrum, i.e. largely independently from the system of the system operator. Smart card-based usage systems and usage methods can be employed in all public access areas, i.e. public transportation, swimming pools, performance locations such as stadiums, theaters and the like, in parking garage systems and even in more or less automated merchandise purchase systems, gas stations, supermarkets and the like.

BRIEF SUMMARY OF INVENTION

Proceeding on the afore-described prior art, the invention provides a system and a method for managing usage authorizations that are based on the use of smart cards, which offer high flexibility and a high level of security for both the operator and the user, if possible do not require a permanent communication connection between the field devices and a central computer, and are also practical for a timely mass operation.

To resolve the technical problems, the invention suggests the use of a system for the management of usage authorizations that are based on the use of smart cards, comprising a central computer system, field devices, and smart cards carried by potential users, wherein the central computer system maintains databases with all information relating to the users, user accounts, their assigned smart cards, field devices and products, establishes and maintains at least at times a communication connection with the field devices, and issues instructions on actions to be conducted based on the available information and transmits these to a plurality of smart card-based relevant field devices, with the field devices maintaining at least some data inventory of information relating to the smart cards and products so that when a communication connection is established between a field device and a smart card at least a portion of the smart card-related instructions is processed from the instruction list and stored on the field device side and can be transmitted to the central computer system during the next communication connection, and wherein the smart cards carry an identification and exchange information with a field device when a communication connection exists and store a specified number of processed instructions.

The system pursuant to the invention and the corresponding method create various information management levels, wherein the different levels communicate with one another in a specified communication structure.

The central computer system forms the main level. Its databases comprise all information on the system elements, i.e. all field devices and all smart cards. Beyond that, information about products is maintained, and finally the required information on the registered users, i.e. account information, credit card information, product profiles, to the extent that they are products that can be planned, such as monthly tickets or the like, etc.

The field devices form the field level. This is where the data inventory with information about the subordinate systems is located, in essence thus the products and their properties as well as possibly information on special cards. The smart cards contain usage information and system information, for example an identification number that clearly identifies the smart card in the system and for example a product number, an account balance and a history, or only individual parts thereof.

The hierarchies of the system interact by means of instructions found in so-called action lists. These are prepared and issued exclusively by the central computer system, specifically on the basis of the existing information. In the central computer level a system called an instruction manager is used for preparing the action lists. For this, information is used from the acknowledgments of the field devices on conducted actions, the entire action list history, the account handling processes, the fraud detection processes and possible additional information based on direct customer notification, for example via a graphic user interface. A registered user is identified in connection with his creditworthiness. For example, he has an account balance, or credit card information is available or a debit request exists. The central computer system practically has a complete virtual image of the entire system comprising the field devices, the products and the smart cards. It now links the existing creditworthiness information with the system information and prepares instruction lists, for example on a smart card with a certain identification to credit a certain credit balance, to continue accepting a monthly ticket, or the like. This is used to prepare instructions that are transmitted to all relevant field devices. Smart card-based relevant field devices are such that correspond to the user profile. If it involves for example a user who travels exclusively by bus, then the relevant field devices arranged at the bus stations or on the buses will receive the information; the remaining field devices do not necessarily require it, but of course can receive it as well.

The field devices thus manage smart card-related instructions to some extent. If communication is established between a smart card and a field device anywhere, then the instructions, which can be sequentially numbered, are processed. This leads to an information exchange between the smart card and the field device, and a specified number, for example the last three processed instructions, is stored on the smart card as history. In this manner, instructions are prevented from being executed multiple times when, for example, the same smart card appears within a very short period of time on a different field device. The field devices would only process the more recent instructions that have been stored beyond the history of the smart card.

The instruction list, pursuant to one suggestion of the invention, always contains just enough instructions per card as said card can store as history. This logic in the preparation of the instruction list is a functionality of the central computer.

The field devices record executed instructions and transmit these recordings back to the central computer system with the next communication connection, whereupon said system updates its own information. Beyond that, the central computer system prepares updated instruction lists, from which processed instructions are eliminated and to which additional, newer instructions are added.

In order to avoid having the same instructions executed multiple times, the numbers of the last actions executed are memorized in a history on the card. When the card appears again in the communication area of a field device, the device can thus determine which possibly not updated action instructions no longer have to be performed.

The central computer system thus compares the identification of the smart card and the executed instructions before pursuing further actions. For this, various variations are basically possible. If pursuant to the suggestion the instruction list per card always contains only as many instructions as it can store, the central computer controls the processing of the instructions. It is always complete instruction lists that are transmitted. Pursuant to an alternative suggestion, instruction lists can also be supplemented sequentially. For example, any random number of instructions per card can be transmitted to the field device. These also contain, for example, the instruction to delete already processed instructions that are still contained in the instruction list of the field device. In this case, the field level is assigned the responsibility to execute always only as many instructions and copy them onto the card as said card can store. With a consistent continuous numbering of all instructions it is thus ensured that no instructions are executed twice. Since, for example, the last three executed instructions on the card or, for example, only the number of the last instruction are memorized, a field device that has not been updated yet can still continue with the next sequential number if a contact is established between the smart card and the field device.

It is already apparent that this system and the method relating to it offer the advantage that the smart card contains no security-relevant information whatsoever and its loss practically cannot get the user into trouble. It is also evident that the system is extremely flexible. It can function not only like all existing traditional systems such as crediting of money, account balance identification or creditworthiness index, credit card usage and the like, but beyond that it can also be adapted and adjusted in a user-related fashion down to the smallest detail.

The instructions compiled by the central computer, which form an action list to be transmitted to the field devices, are numbered sequentially and can contain various information depending on the process. Initially a user will register with the operator, provide his personal data and clarify the payment method. Then a smart card identification will be assigned, and this can also be equipped for initiation purposes with a code identifying one or more products, for example the fact that it is a monthly ticket for a certain route, a card for a certain network section, or the like. After the card has been sent to the user, the field devices will receive within the framework of the next action list the information to list this card as being active, to what product or what product group it is assigned, or the like. If now a communication connection is established between said smart card and any field device, the field device will prepare a recording, based upon which card was used within the provided product group on such a date at such a location. During the next communication connection, this information is made available to the central computer. The computer can in turn translate this information into additional actions and perform a match of the parallel smart card-related background account. For each smart card in the central computer an account can be kept in the background by managing the properties of the memorized products based on the recorded usage of the card, e.g. remaining balance, current validity of a product.

A major problem of automatic systems is, for example, the regular and timely provision of instruction lists with instructions on modifying product properties, such as e.g. updating time cards for a new validity area or the renewal of privileges, for example a change in months for monthly tickets and comparable processes, wherein it is assumed, for example, that the monthly ticket has been extended. A first-time usage can be approved after a time-related priority change. Based on the usage notification, the central computer system verifies the creditworthiness, or whether the card has been extended and paid. If this is not the case, an instruction is, for example, issued to all devices to delete the product code when the card appears the next time and assign an inactive status to this card from then on.

One possibility would be to send, with every change in months or weeks or other time-related change that is relevant as a function of the offered products, new instruction lists to all field devices, which would cause the new validity date to be noted on each smart card. This, however, would lead to an immense data flow and memory expenditure.

In order to prevent this, pursuant to one variation it may be provided that based on a piece of information located on the card the field device will allow the card to pass as being valid after a corresponding change in time and will make its usage accessible to the central computer during the next communication via the usage recording. The central station will then check whether the creditworthiness of the customer is given or whether a corresponding amount has been requested. In the positive case no new instruction will then be issued and nothing will change on the card. In the negative case information is transmitted with the subsequent instruction list to the field devices to delete the information located on the card regarding the usage recording of the ticket when the card appears the next time in a communication device of a field device. This card can then no longer be used in the system without further action.

An alternative thereto may be that, deviating from the above-described possibility, a card is made available exclusively for the time product and is completely deactivated when usage occurs after the start of a period and is transmitted to the central computer, but no monetary service is provided in return. In the instruction list the complete deactivation of the card and/or the product would then be transmitted to the field devices.

An alternative possibility consists of a version where in addition to the product information, for example a monthly ticket for a certain zone, route or the like, the time limit is noted. This has the particular advantage that the card can be used positively even in offline devices of the entire system, for example with hand-held computers used on trains or the like. Based on the product information, the server can initiate by means of the instruction list that with the appearance of a smart card having that product number the new time limit is written onto the card. This product qualification system can then be administered in the field devices and be implemented at the instruction of the central computer so that special card designations or suitability designations on the card can be avoided. This offers the advantage that card misuse is largely prevented.

It is already apparent that the system and method pursuant to the invention are extremely secure. Relevant information will only be located on the central computer system, however the field level and the usage level, i.e. smart card, contain only system and usage information. Since no user or credit card information is contained on the smart card, card misuse in this respect cannot occur. Based on the recorded usage processes the system can also detect at what time and in what location what product was purchased or used with what card. By means of logic analysis it can now be determined whether, for example, a second communication with the same card occurs at an entirely unlikely location or with an unlikely product or product assigned to the card, which can be an indication of the existence of a counterfeit or duplicated card. Such suspicions are detected in the central computer system and lead to instructions that block or deactivate such suspicious cards.

The system pursuant to the invention and the method relating to it are extremely flexible and can be adapted to different billing, collection, creditworthiness and other payment systems. The system has an extremely high security level and requires no permanent connection between the central computer and the field devices.

When used in connection with public transportation, the field devices comprise, for example, fare boxes in buses, parking gates, access gates in train stations or swimming pools and the like. Through a hierarchical division of intelligence and information, communication is reduced to the essential parts and in particular no security-relevant information is transmitted.

The system pursuant to the invention and the method relating to it offer a series of benefits compared to conventional and familiar systems. A significant aspect is that the smart card carried by the user does not contain any relevant information. The card as such may contain, apart from some identification, the product codes. Beyond that it contains to a limited extent the more recent history of instructions that were processed most recently and possibly also information about time and location, for example the field device number or the like, relating to the respective communication. The still publicly accessible field devices, which however are no longer individually assigned, likewise contain primarily only product information and product properties in the data inventory, possibly also information relating to special cards, the action lists or instruction lists.

All security-relevant information is only located on the central computer. There virtual card accounts are kept and connected with the user information and their creditworthiness information and are managed. An accurately structured, hierarchical, instruction-based communication enables random processing, without making card-or user-specific information available. This way the entire system becomes on one hand significantly more secure against misuse since the user himself does not have any further information or keeps it available on his card. And moreover card manipulations are excluded. The logic system serves the recognition of the use of card duplicates and the like. The purely product-related information management furthermore enables the combined operation of online-capable and not online-capable devices. Finally, systems limited in time can also be implemented in a simple manner, with a high level of security and low error function possibilities, as has been explained in the example of monthly tickets and the like. Even the change in the end dates designating the time frames takes place in a product-related and instruction-based fashion. Although not online-capable devices or field devices can neither process instructions nor change corresponding data, this can be compensated, for example, by defining a grace period within which the user must establish a communication connection with the card on an online-capable field device.

BRIEF DESCRIPTION OF THE DRAWINGS

Further benefits and features of the invention result from the following description based on the figures. They show.

DETAILED DESCRIPTION OF THE DRAWINGS

In all three figures the system is broken down into a division of main level, field level and user level, i.e. the smart card level.

As can be seen, the levels interact by means of the communication that is based on the transmission of instruction lists, usage recordings and report lists.

Figure 1:
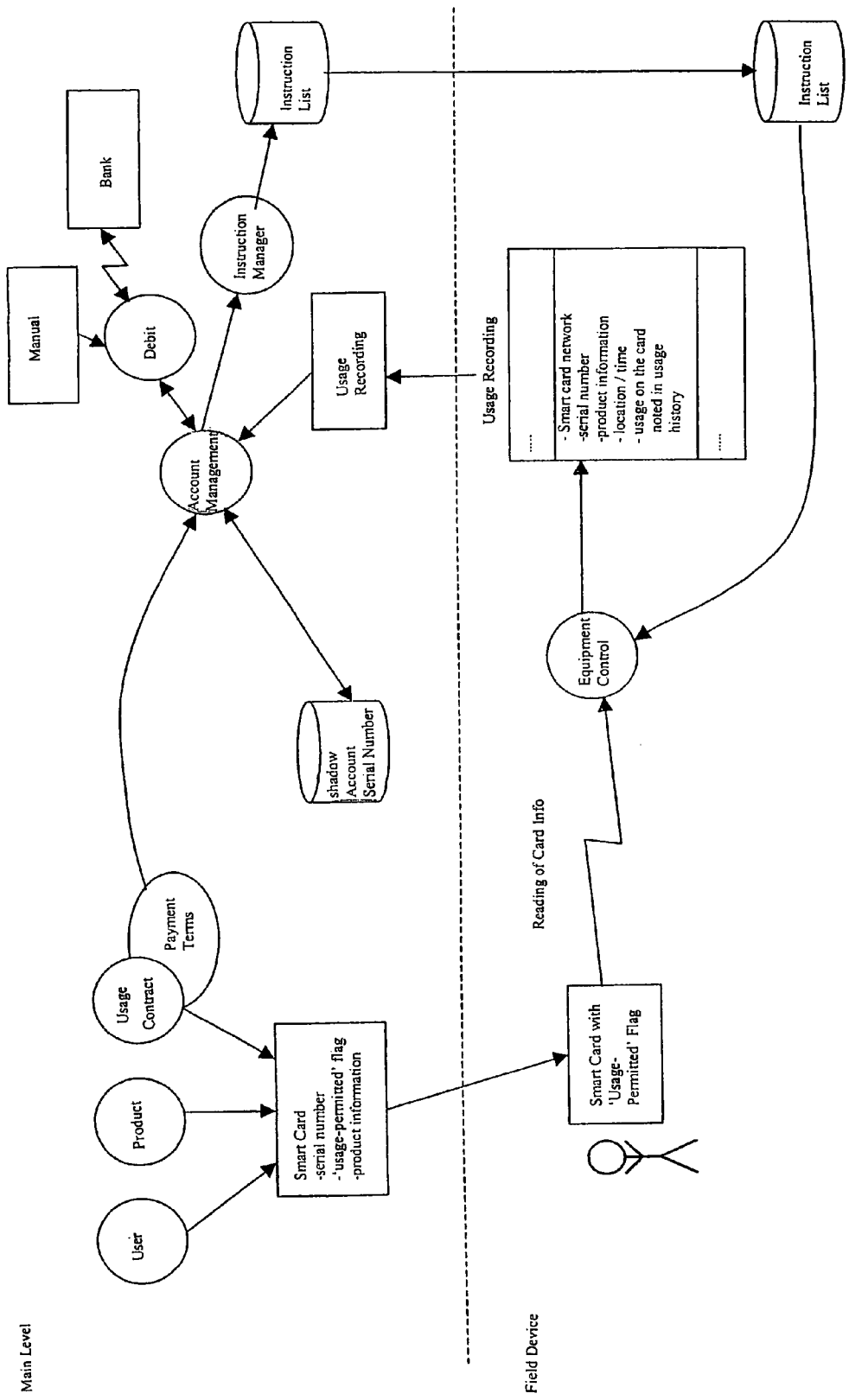
FIG. 1 a functional diagram to explain the system and method pursuant to the invention based on a first exemplary embodiment.

Pursuant to FIG. 1 the main level comprises the instruction manager in its core, which is directly connected with an account management process. Via this account management process, a shadow account to the smart card serial number is kept. The account management process also organizes debiting in relation to manual payments, bank draft, credit card management and the like. Beyond that the main level comprises the user information, the product information, the usage contract and the user-related payment decisions, which in turn are part of the account management process. Some of this information is written onto the smart card, which is then made available to the user. This includes the serial number, product information and in the illustrated embodiment a flag for a "usage-permitted mode".

The instruction manager evaluates all information and prepares an instruction list, which is transmitted to the equipment control of the respective field devices. When the smart card reaches the communication area of the field device on the field device level, the instructions from the instruction list that relate to said smart card are processed. Beyond that a usage log is maintained, which contains information that the smart card was used at such a location at such a time, the serial number, the product information, and what usage history has been noted on the card.

The usage recordings are transmitted to the central computer system during the next communication connection with said system and are then included in the account management process. The instruction manager can thus update the instruction list and transmit the completely updated instruction list again to all field devices.

Due to the fact that the usage history is recorded on the smart card, in the meantime any other field device that still contains the old instruction list can detect what instructions have already been processed.

The field devices additionally usually assume that usage is permitted for said smart card. If based on the account management process and the usage recordings the instruction manager finds that services have been used, but not paid for, for example a time-based ticket was not extended or the like, that balances are exhausted, etc. then deletion of the usage of the 'permitted' flag can be initiated with the instruction list. The card is then blocked for further use. This is the case at least until the flag based on existing instructions can be set again.

Figure 2:
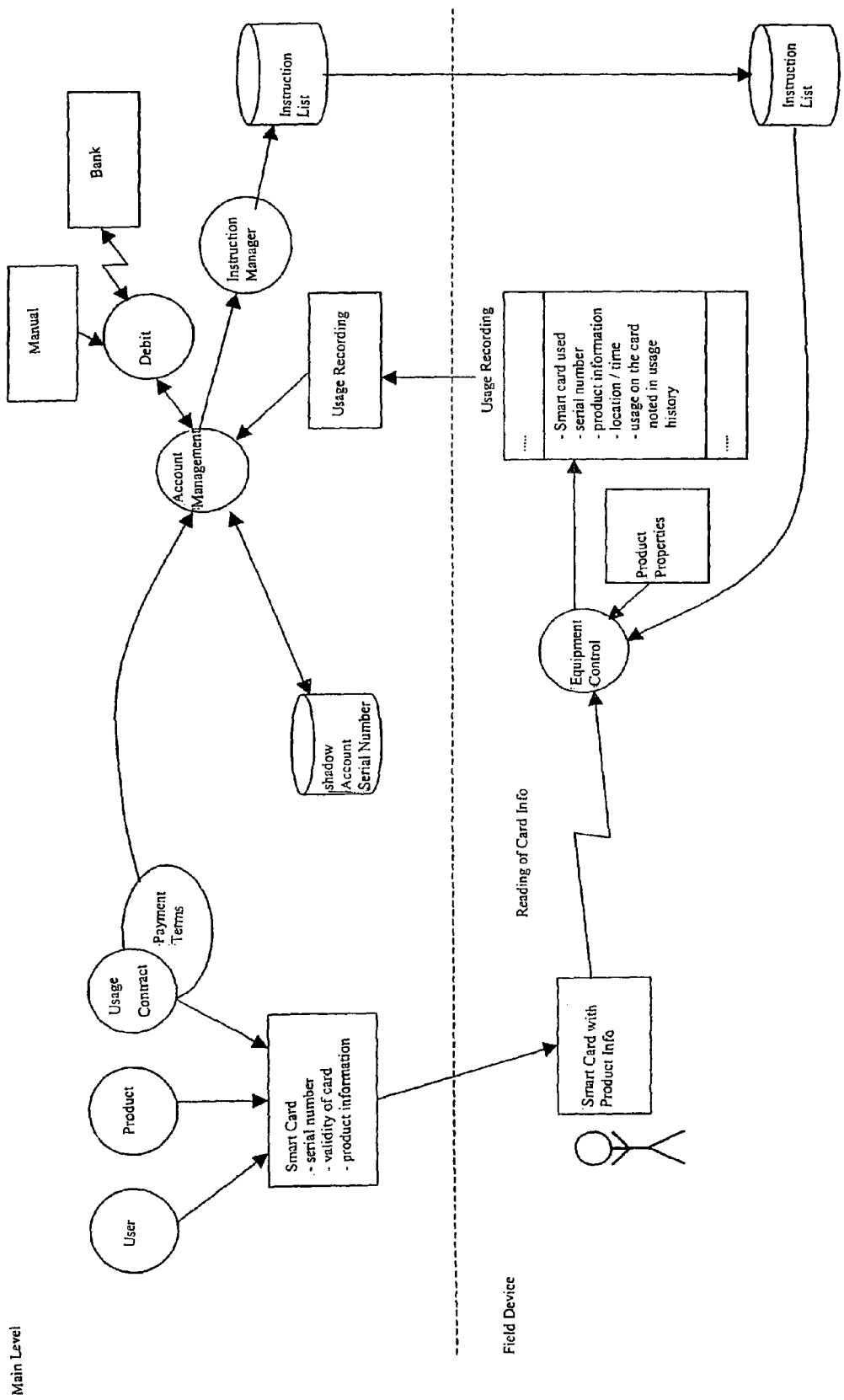
FIG. 2 a functional diagram to explain the system and method pursuant to the invention based on a second exemplary embodiment and FIG. 3 a functional diagram to explain the system and method pursuant to the invention based on a third exemplary embodiment.

In the embodiment pursuant to FIG. 2 basically the same system is used as far as the main level is concerned. On the field device level, properties of the products are included as data inventory. Contrary to exemplary embodiment 1, the smart card does not carry a 'usage-permitted' flag, but instead carries product information. Product information includes, for example, the product numbers for which said card is approved. Properties of the respective product information are available on the field device level to said device so that it can make decisions during communication with a smart card. Only when based on the usage recordings the instruction manager detects that, for example, a product that has not been paid for is used, for example a monthly card has not been extended, will the product information be changed with the instruction list and the card be changed the next time it appears in the communication area of a field device.

Figure 3:
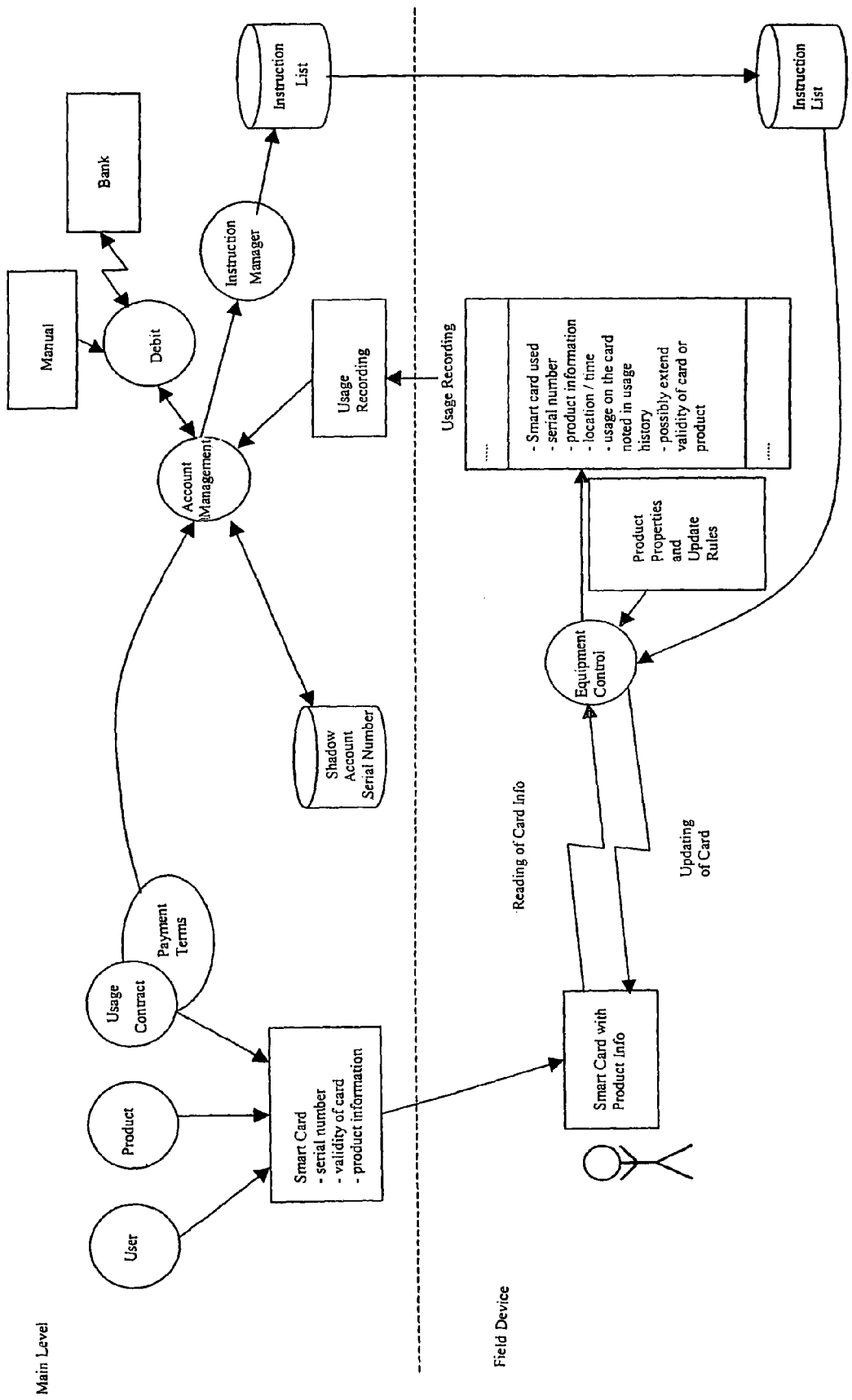

The exemplary embodiment pursuant to FIG. 3 corresponds to the exemplary embodiment pursuant to FIG. 2. It represents an expanded version in that additional information is added to the product properties, for example update rules. In this manner the field device can decide that, for example, all products of a certain type are extended at a certain time and a corresponding period, etc. The field device can then store the corresponding information on the smart card.

Writing standard information such as usage recordings, usage history or the like on the smart card is given in all cases. The communication arrow from the equipment control to the smart card in FIG. 3 shows the concrete process of writing a product property onto the smart card.

If, for example, a product is identified as a monthly ticket based on its number and the rule states that these tickets shall be extended by one month at the end of the month, according to the rule the equipment control writes the new validity data on the card at the beginning of the month when the card first appears in the communication area of a field device that is online-capable.

The described exemplary embodiments only serve the explanation of the invention and do not limit it.

The invention claimed is:

1. A system for man aging usage authorizations that are based on use of smart cards, the system comprising:
   a central computer system;
   field devices;
   smart cards carried by potential users, the smart cards carrying only system and usage information but containing no security-relevant user information or credit card information;
   wherein the central computer system maintains databases containing all information that relates to the users, user accounts, their assigned smart cards, field devices and products;
   a first communication connection with the field devices established and maintained at least at times by the central computer system;
   instructions on actions to be conducted, the instructions prepared by the central computer system based on the available information in the central computer system, the instructions being in the form of an instruction list, wherein the instructions are numbered sequentially so that the instructions each have assigned a number, the instruction list being transmitted to the field devices via the first communication connection;
   wherein the field devices are configured for establishment of a second communication connection with the smart cards when the first communication connection between the field devices and the central computer system is off-line;
   the field devices being further configured to maintain at least some data inventory of information relating to the smart cards and products so that when the second communication connection is established between at least one of the field devices and at least one of the smart cards, at least some of the instructions are processed from the instruction list;

wherein the smart cards are configured so as to memorize the numbers assigned to the instructions that have been processed from the instruction list when the second communication connection has been established;

wherein the field devices are configured to determine, at the time when the second communication is established, which instructions no longer have to be performed based on the numbers that are memorized on the smart cards, and process only more recent instructions of the instruction list in the field devices so that no instruction is executed twice, wherein the numbers assigned to the more recent instructions being processed are memorized on the smart cards, wherein the more recent instructions being processed are stored on the at least one field device and transmitted to the central computer system when the first communication connection between the field devices and the central computer system is brought on-line.

2. The system pursuant to claim 1, wherein the instructions contain a smart card identification.

3. The system pursuant to claim 1, wherein a number of instructions per smart card transmitted from the central computer system to the field devices is less than or equal to a number of instructions that can be stored on the corresponding smart card.

4. The system pursuant to claim 1, wherein the central computer system updates the databases based on acknowledgments from the field devices regarding processed instructions and prepares update instructions.

5. A method for managing usage authorizations that are based on use of smart cards, the method comprising:

using a system that comprises a central computer system, field devices and smart cards carried by potential users, the smart cards carrying only system and usage information but containing no security-relevant user information or credit card information;

maintaining databases in the central computer system, the databases containing all information that relates to the users, user accounts, their assigned smart cards, field devices and products;

establishing and maintaining at least at times a first communication connection between the central computer system and the field devices;

issuing instructions on actions to be conducted based on the available information in the central computer system, the instructions provided in the form of an instruction list and transmitting the instruction list to the field devices, wherein the instructions on the instruction list are numbered sequentially so as to each have assigned a number and transmitting the instruction list to the field devices via the first communication connection;

configuring the field devices for establishment of a second communication connections with the smart cards when the first communication connection between the field devices and the central computer system is off-line;

maintaining via the field devices at least some data inventory of information relating to the smart cards and products so that when the second communication connection is established between at least one of the field devices and at least one of the smart cards, at least some of the instructions is are processed from the instruction list;

configuring the smart cards so as to memorize the numbers assigned to the instructions that are processed from the instruction list when the second communication connection has been established;

determining with the at least one field device when communicating with the at least one smart card which instructions no longer have to be performed based on the numbers that are already memorized on the at least one smart card and processing only more recent instructions of the instruction list in the at least one field device so that no instruction is executed twice; and memorizing the numbers assigned to the more recent instructions being processed on the at least one smart card, wherein the more recent instructions being processed are stored on the at least one field device and transmitted to the central computer system when the first communication connection between the at least one field device and the central computer system is brought online.

6. The method pursuant to claim 5, wherein the instructions contain a smart card identification.

7. The method pursuant to claim 5, wherein a number of instructions per smart card transmitted from the central computer system to the field devices is less than or equal to a number of instructions that can be stored on the corresponding smart card.

8. The method pursuant to claim 5, wherein the central computer system updates the databases based on acknowledgments from the field devices regarding processed instructions and prepares update instructions.

9. The method pursuant to claim 5, wherein based on occurrence of the second communication connections between the smart cards and the field devices and possibly the product information, the central computer system performs a logic analysis in order to detect the usage of counterfeit or duplicated cards from products and product properties that are unlikely based on the logic analysis.

10. The method pursuant to claim 5, wherein based on occurrence of the second communication connections between the smart cards and the field devices and possibly the product information, the central computer system performs a logic analysis in order to detect the usage of counterfeit or duplicated cards from locations that are unlikely based on the logic analysis.

11. The method pursuant to claim 5, wherein the field devices change product properties automatically when a change in said properties occurs on the smart cards containing such products.

* * * * *